United States Patent [19]
Antonov

[11] Patent Number: 5,213,551
[45] Date of Patent: May 25, 1993

[54] VARIABLE-RATIO TRANSMISSION DEVICE, ESPECIALLY FOR MOTOR VEHICLES

[75] Inventor: Roumen A. Antonov, Paris, France
[73] Assignee: Mat Holdings B.V., Netherlands
[21] Appl. No.: 768,877
[22] PCT Filed: Feb. 27, 1991
[86] PCT No.: PCT/FR91/00159
  § 371 Date: Oct. 24, 1991
  § 102(e) Date: Oct. 24, 1991
[87] PCT Pub. No.: WO91/13275
  PCT Pub. Date: Sep. 5, 1991

[30] Foreign Application Priority Data

Feb. 28, 1990 [FR] France ............................ 90 02480
May 23, 1990 [FR] France ............................ 90 06438

[51] Int. Cl.$^5$ .................................... F16H 47/08
[52] U.S. Cl. ........................... 475/257; 192/103 A;
  192/105 C; 192/70.11; 192/70.2; 74/665 P;
  74/718
[58] Field of Search ............... 475/257, 258, 266, 267,
  475/199; 192/103 A, 105 C, 70.11, 70.14, 70.2,
  70.21; 74/665 P, 665 R, 718, 720

[56] References Cited

U.S. PATENT DOCUMENTS

| 2,143,312 | 1/1939 | Griswold | 192/105 C X |
| 2,176,224 | 10/1939 | Nutt | 192/105 C |
| 2,224,440 | 12/1940 | Lewis | 192/105 C |
| 2,261,106 | 11/1941 | Cotterman | 475/257 |
| 2,373,234 | 4/1945 | Duffield | 475/257 X |
| 2,892,355 | 6/1959 | Forster | 74/720 |
| 3,426,618 | 2/1969 | Hau et al. | 475/54 |
| 3,903,757 | 9/1975 | Hau et al. | 475/57 |
| 4,056,986 | 11/1977 | Hobbs | 74/720 X |
| 4,082,011 | 4/1978 | McQuinn et al. | 74/862 |
| 4,095,681 | 6/1978 | David | 192/103 A X |
| 4,111,291 | 9/1978 | Horstman | 192/105 C |
| 4,413,535 | 11/1983 | Hobbs | 74/720 X |
| 4,474,079 | 10/1984 | Crockett | 74/720 X |

FOREIGN PATENT DOCUMENTS

| 3801911 | 8/1988 | Fed. Rep. of Germany ... 192/70.11 |
| 3825733 | 2/1989 | Fed. Rep. of Germany . |
| 392592 | 11/1908 | France . |
| 686463 | 7/1930 | France . |
| WO88/03097 | 5/1988 | World Int. Prop. O. . |

Primary Examiner—Allan D. Herrmann
Assistant Examiner—William O. Trousdell
Attorney, Agent, or Firm—Kenyon & Kenyon

[57] ABSTRACT

A transmission (1) has an input (2) connected to an engine (3). At a speed above idling, a centrifugal clutch (9) connects the engine to a pump (8) of a torque converter (7) and also to a sun gear (14) of a planetary gear train (13). A turbine (11) of the torque converter is connected to a ring gear (16) of the planetary gear train, and a planet carrier (18) is connected to an output (4) of the transmission. A free wheel (22) mounted between the ring gear and a stationary housing prevents reverse rotation of the ring gear. At low engine speeds, the power passes via the sun and planet gears through the planet carrier to the output, while reaction torque exerted by the planet gears on the ring gear is greater than forward torque transmitted through the torque converter, so that the ring gear is held stationary by the free wheel. In this condition, the planetary gear train acts as a mechanical speed reducer. As the engine speed increases, the torque transmitted by the converter to the ring gear exceeds the reaction torque of the planet gears, driving the ring gear in the forward direction at progressively increasing speeds that approach the speed of the planet carrier, thus progressively decreasing the speed reduction of the gear train. The planetary gear train serves to add the engine power received directly at the sun gear and via the hydraulic torque converter at the ring gear.

29 Claims, 6 Drawing Sheets

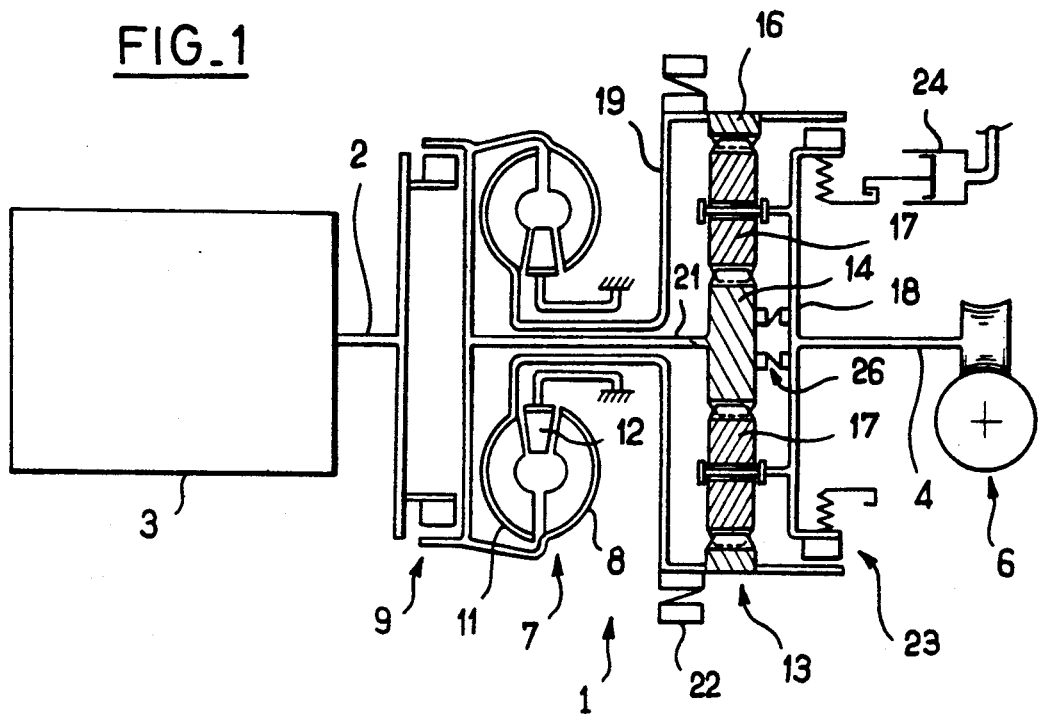
FIG_1
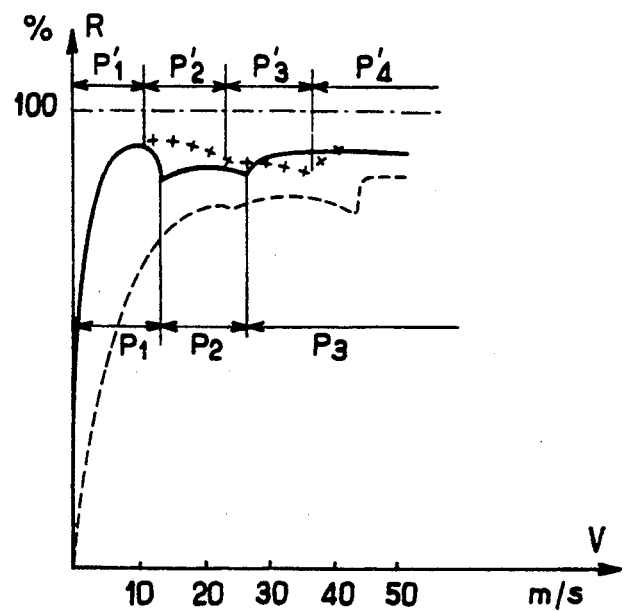
FIG_2

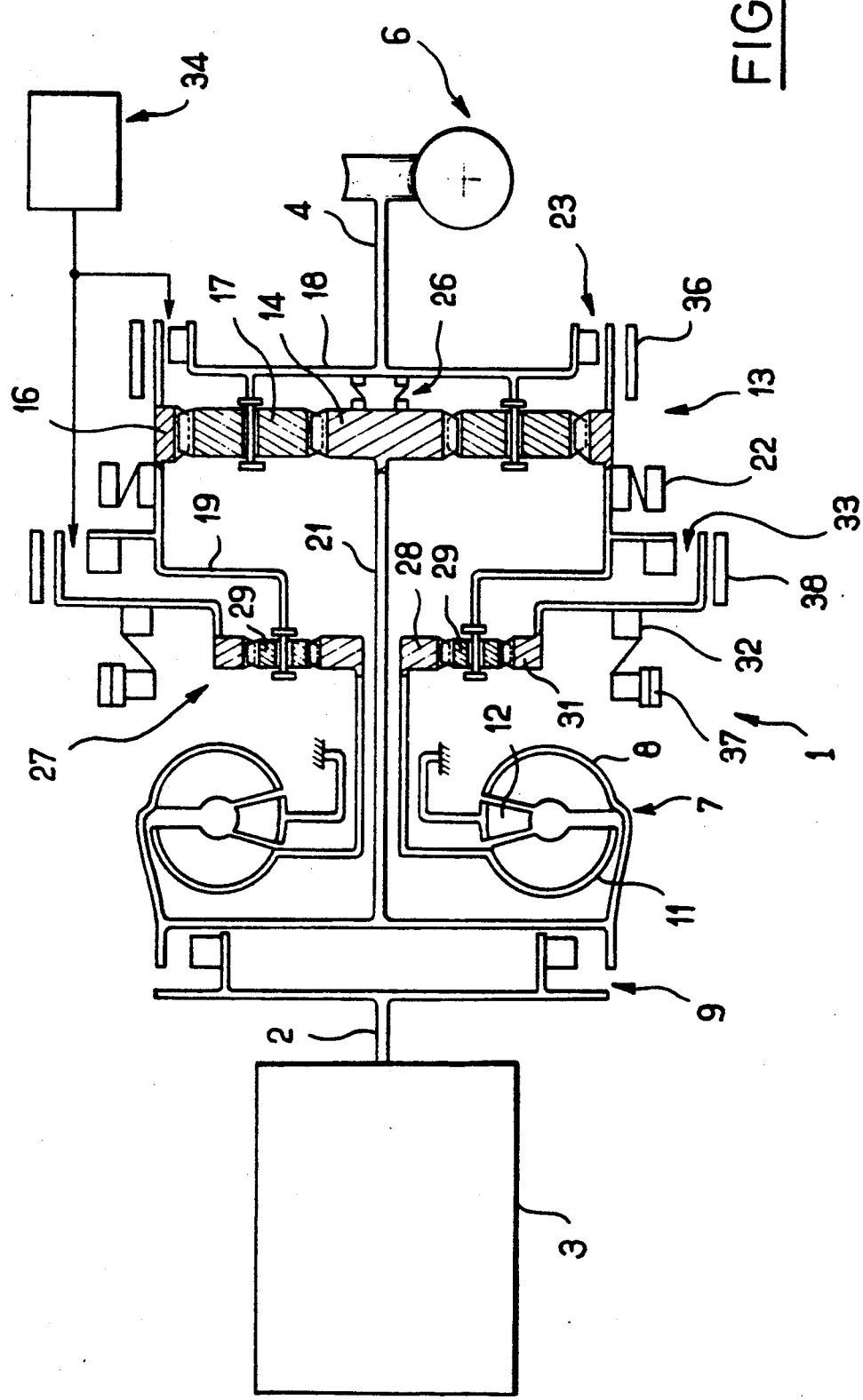
FIG_3

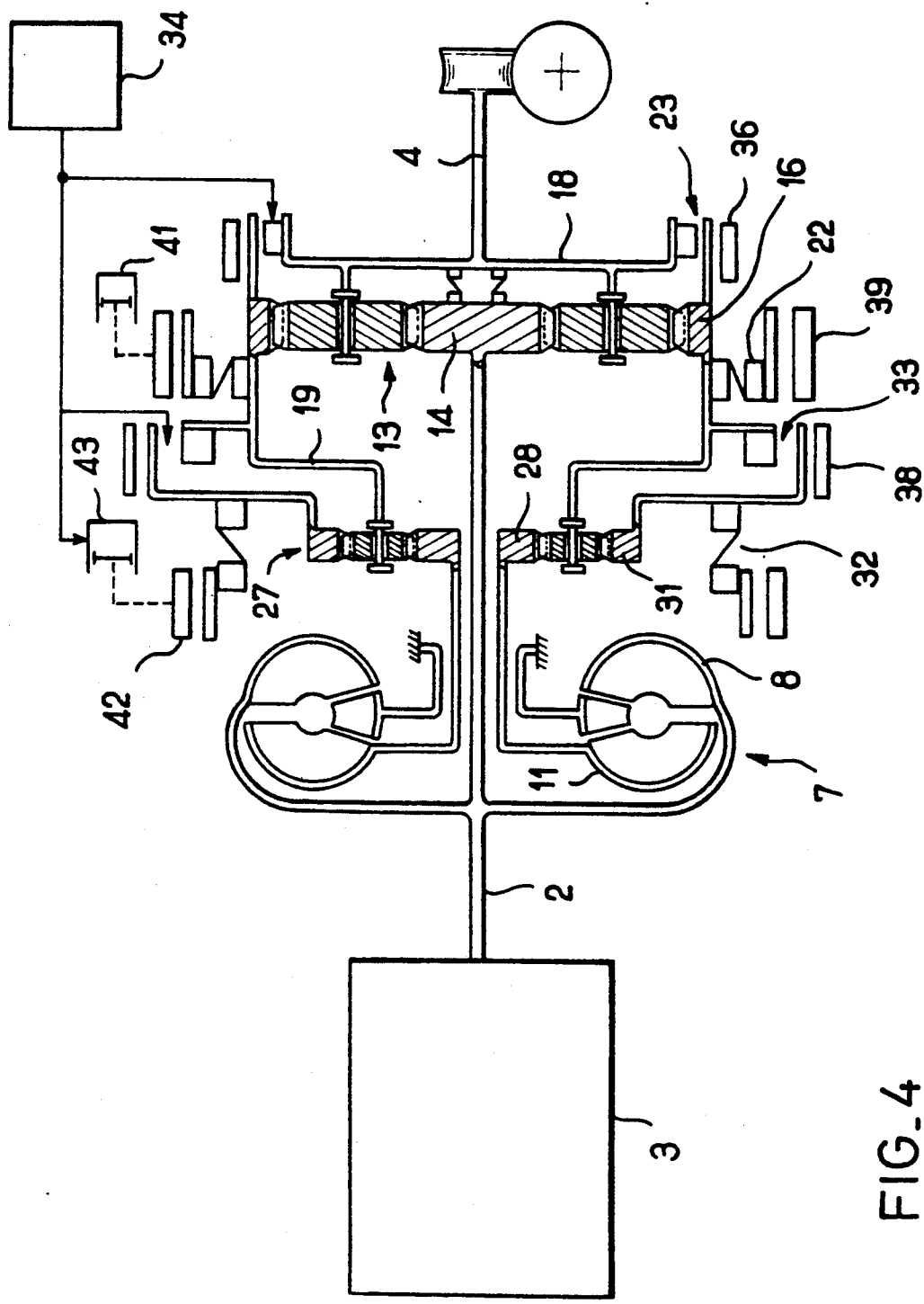
FIG._4

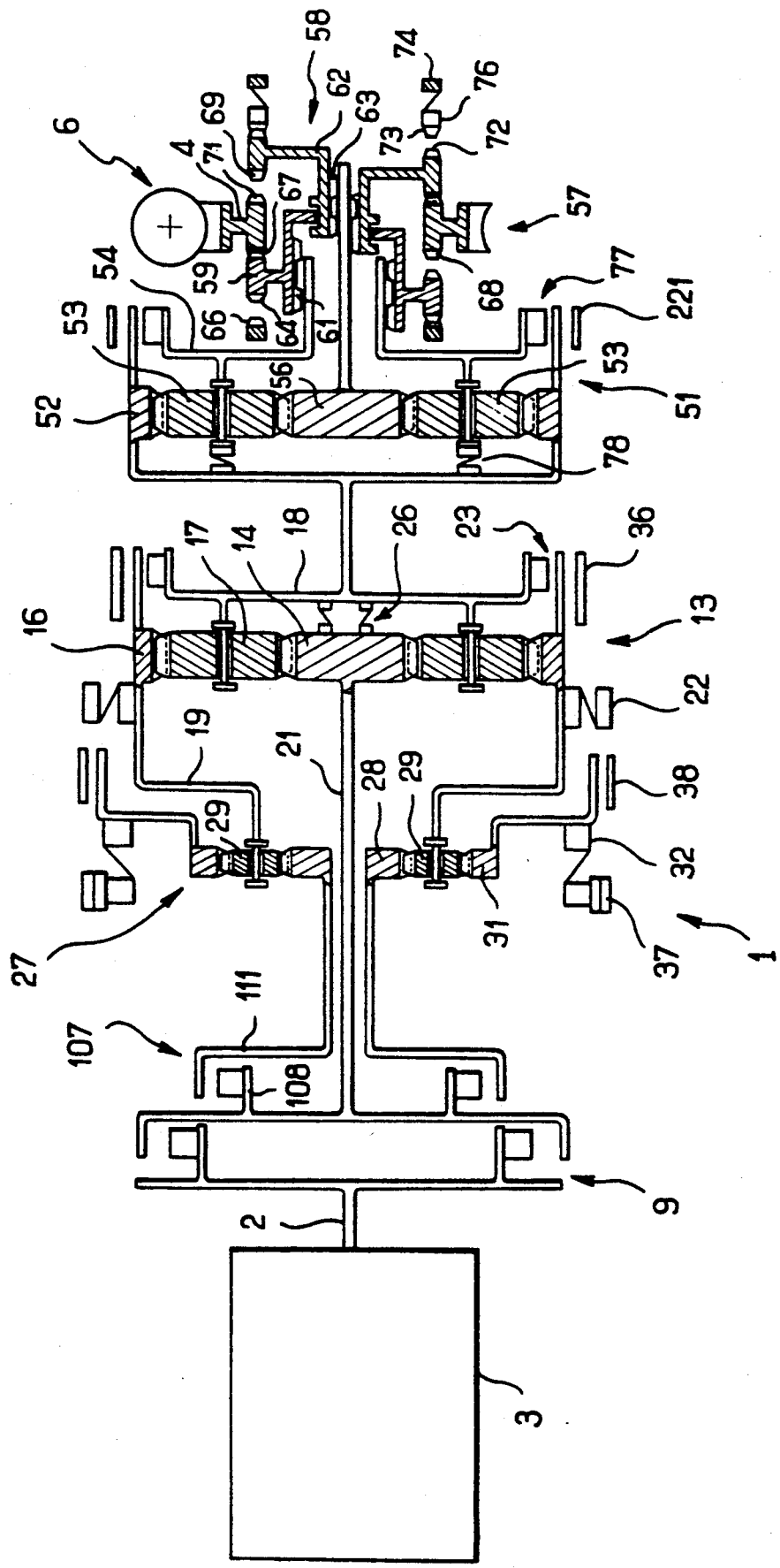
FIG._5

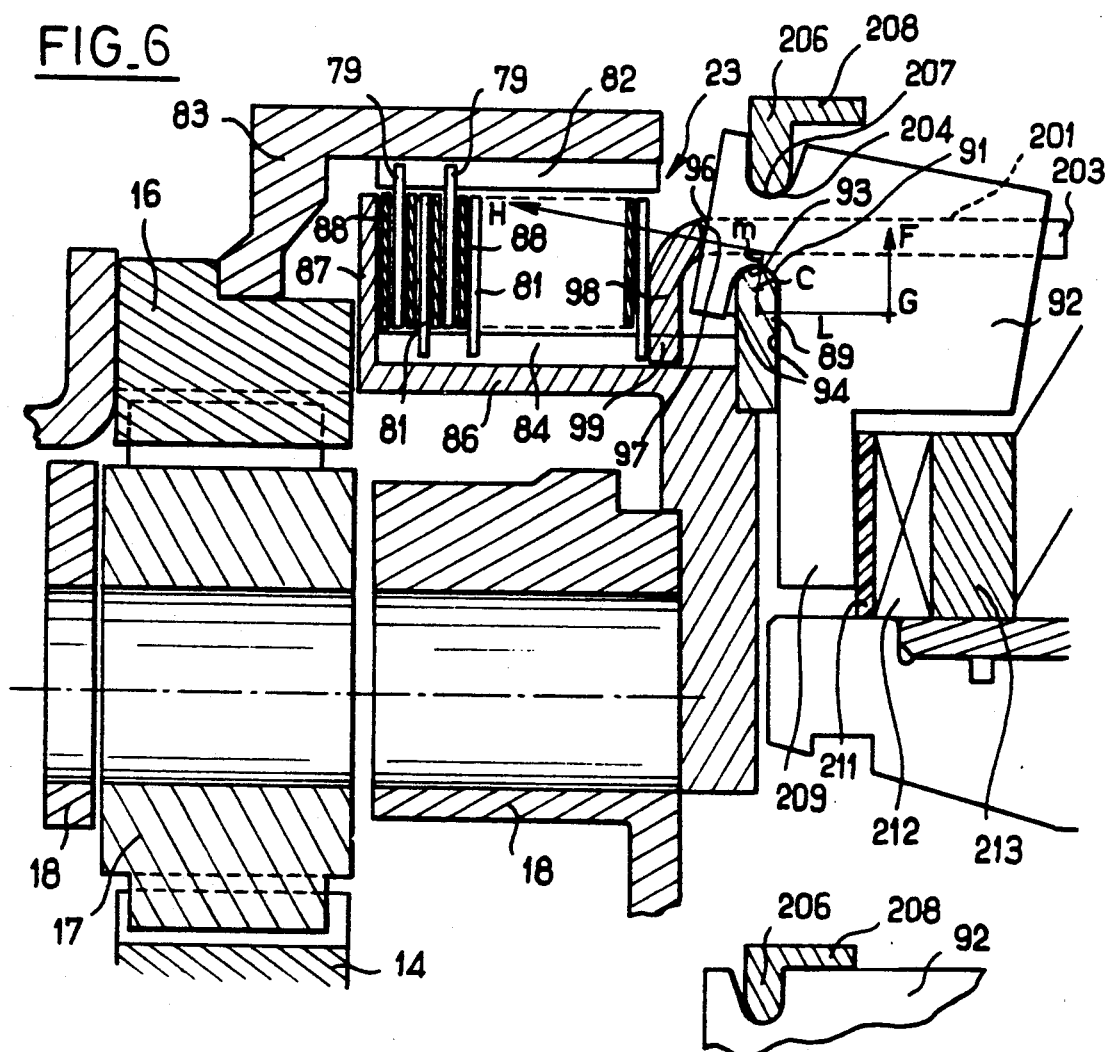
FIG. 6
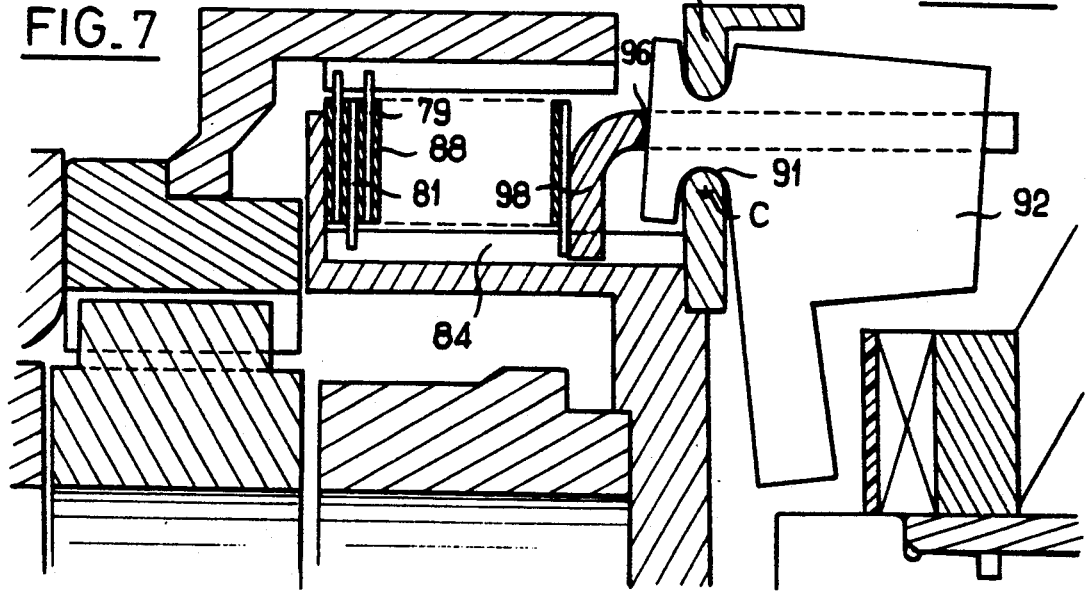
FIG. 7
FIG. 8

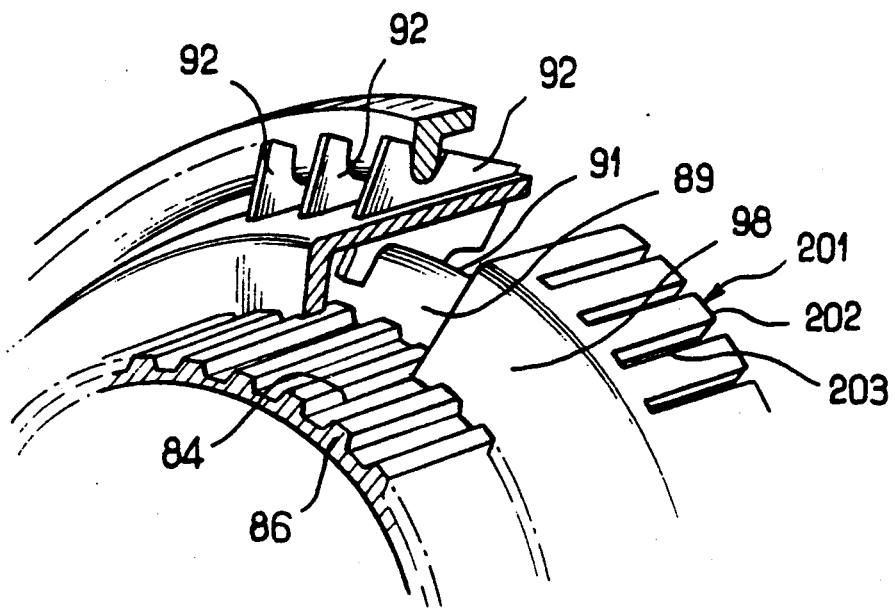
FIG_9
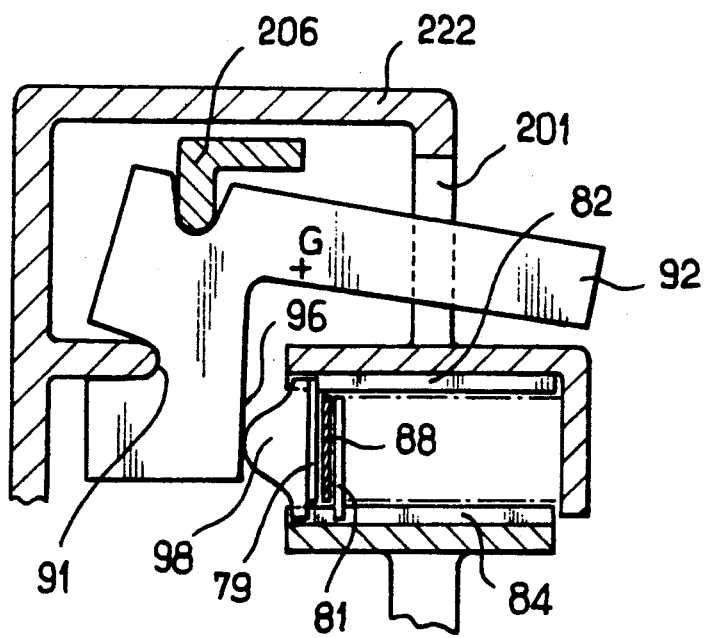
FIG_10

VARIABLE-RATIO TRANSMISSION DEVICE, ESPECIALLY FOR MOTOR VEHICLES

BACKGROUND OF THE INVENTION

The present invention relates to a variable-ratio transmission device, especially for motor vehicles.

So-called "automatic transmission" devices comprising an energy-transfer means with relative angular slip connected in series to a triple-access differential mechanism, are known.

The energy-transfer means generally consists of a hydraulic torque converter. It comprises, as a driving member, a hydraulic energy generator, called a pump, connected to the input of the transmission device and, as a driven member, a hydraulic motor, called a turbine, which produces mechanical energy from the hydraulic energy supplied by the pump and which is connected to one of the accesses of the differential mechanism.

The differential mechanism generally consists of a planetary gear train, of which an access other than that connected to the turbine is connected to the output of the transmission device. The third access of the planetary gear train can either be immobilised, to cause the planetary gear train to operate as a reducer, or be connected to one of the other two accesses, to cause the planetary gear train to operate by direct drive.

The torque converter has the advantage of replacing the friction clutch and of itself giving rise, as a function of its turbine/pump speed ratio, to some variable multiplication of the torque which makes it possible to produce the transmission with a reduced number of separate mechanical ratios, for example only two ratios, with a single planetary gear train, as stated above.

On the other hand, conventional automatic transmissions have some serious disadvantages. Their efficiency is very poor, especially in town traffic. Moreover, their weight is very great, their cost is high and they are of great complexity, especially when they comprise numerous gear ratios, this being the current trend.

Admittedly, the most recent transmissions comprise a direct-drive device which is put into operation when the vehicle reaches a cruising speed, in order at this stage to eliminate losses in the converter. Nevertheless, this device, which further increases the complexity, does not solve the problem of the very high losses caused by the converter at low speed, particularly in the acceleration phase.

Furthermore, U.S. Pat. No. 3,426,618 makes known a device, the input of which drives one of the accesses of the differential mechanism directly and drives another access of the differential mechanism by means of a torque converter and a reducer.

Thus, only some of the power passes via the converter and the losses in the converter can be reduced.

This results, however, in a relatively complex device which, in one of the examples given, comprises two epicyclic gear trains for providing only two transmission ratios. Moreover, the control of the change from one-ratio to the other is complex, with the simultaneous control of a clutch and of a brake as a function of parameters, such as the rotational speed and/or the torque to be transmitted, which necessarily have to be supplied by measurement or detection devices. This system can bring about jolts or, on the contrary, momentary breaks in transmission.

SUMMARY OF THE INVENTION

The object of the invention is, therefore, to provide a variable-ratio transmission device which is much simpler, lighter and more economical than known transmissions and which has an at least as high, if not improved, efficiency.

The invention is thus aimed at a variable-ratio transmission device, especially for motor vehicles, comprising, between an input and an output of the device, a mechanism defining at least a first transmission ratio and a second transmission ratio, the rotational speed of the output being higher in relation to that of the input during operation according to the second ratio than during operation according to the first ratio, the transmission device comprising, furthermore, at least one selective coupling means for effecting the change from the first ratio to the second.

According to the invention, the device is characterised in that the selective coupling means is of a type which is activated as a function of a rotational speed of this coupling means and which allows a relative angular slip with the transmission of a torque which is a function of this rotational speed.

Thus, the change from the first ratio to the second is controlled according to a speed of the selective coupling means itself. There is no longer any need to detect a speed external to this means and then to control the coupling means from outside as a function of this speed. On the contrary, the coupling means can become very simple and independent. It can, for example, be a torque converter or a centrifugal clutch (the torque converter of U.S. Pat. No. 3,426,618 does not perform the function of ensuring a transition between two transmission ratios). The slip capacity of the coupling means, combined with its capacity for transmitting a torque which is a function of the speed, means that the change to the second ratio shifts automatically towards the higher speeds when the torque to be transmitted is high, as is desirable in practice. This is obtained, without the need for detecting the torque to be transmitted. Furthermore, the coupling takes place progressively with an intermediate phase which, in practice, constitutes an additional transmission ratio.

Preferably, the mechanism is a differential mechanism with three accesses and, at least during some operating phases:
 a first access of the differential mechanism is connected to the output of the device;
 a second access of the differential mechanism is connected to a driven member of the angular slip coupling means, a driving member of which is connected to the input of the transmission device;
 a third access of the differential mechanism is connected to the input of the device independently of the coupling means;
 the device comprises, furthermore, means preventing the second access from rotating backwards during operation according to the first transmission ratio.

During operation according to the first ratio, virtually the entire power is delivered to the third access, hence without passing via the selective coupling means, because the rotational speed of the coupling means does not yet allow it to transfer to the second access the reaction torque to be applied to the second access to ensure that the differential mechanism operates as a reducer between its third access connected directly to the input of the device and its first access connected to the output of the latter This reaction torque is supplied by the means preventing the second access from rotating backwards, for example a brake or preferably a free wheel. The first ratio is therefore ensured by mechanical transmission between the third access and the first access, without hydraulic intervention, even when the selective coupling means is a torque converter.

When the rotational speed of the driving member of the transfer means increases, from a particular stage the latter transfers to the second access a torque which exceeds the reaction torque strictly necessary. From that moment, the second access is set in rotation in the direction contributing to increasing the speed of the output of the device. The differential mechanism thereby operates as a power adder, that is to say the first access connected to the output of the device receives the sum of the powers transmitted respectively to the second access via the selective coupling means and the third access directly from the input.

In this second operating phase, the ratio of the transmission between its input and its output varies as a function of the slip in the selective coupling means. If the resisting torque applied to the output of the transmission device is high, the second access is subjected to a high reaction torque, and at least under some speed conditions the selective coupling means can allow a slip which reduces the output/input speed ratio of the transmission and which thus increases the torque of the output of the device. This corresponds to what is expected from a transmission for motor vehicles, namely a relatively high rotational speed of the engine when there is a high torque to be supplied to the wheels.

This provides a transmission device capable of causing a differential mechanism to operate as a variable-ratio reducer, without any external influence or control, other than that corresponding to the torques and speeds of the input and output of the device, being strictly necessary.

The selective coupling means can be a torque converter. This device has the advantage of multiplying the torque when it operates with a slip. On the other hand, it has the disadvantage of being relatively expensive and bulky and of having a permanent energy consumption.

Preferably, the selective coupling means is a clutch controlled as a function of the said rotational speed so as to change from a disengaged state to an engaged state when the said rotational speed of the coupling means crosses a predetermined speed interval in an increasing direction.

It was found, in fact, according to the present invention that a simple clutch controlled with suitable progression could replace the torque converter with the following advantages:
 low cost;
 small bulk;
 absence of losses when it is coupled completely or uncoupled completely;
 acceptable losses, in the end much lower than could be thought beforehand, when the clutch slips under load, above all if only some of the power passes via this clutch, at least at the moment of slip.

Preferably, means are provided for varying the speed range of the clutch as an increasing function of the torque transmitted by the device. The means for varying the speed range reside advantageously in that the gripping force applied to the clutch is an increasing function of the speed. Thus, for a higher torque to be transmitted, requiring a greater gripping force to obtain engagement, the speed at which the clutch engagement takes place is higher.

The present invention is also aimed at an advantageous embodiment of a progressive clutch sensitive to the rotational speed and to the torque to be transmitted.

The present invention is aimed, further, at the addition, in functional terms in series in the transmission device, of an additional two-speed automatic change differential, with the possibility of the manual selection of a reverse ratio.

Other particular features and advantages of the invention will also emerge from the following description of various non-limiting examples.

BRIEF DESCRIPTION OF THE DRAWINGS

In the accompanying drawings:

FIG. 1 is a diagrammatic view in axial section of a first embodiment of the transmission device according to the invention;

FIG. 2 is a comparative graph showing efficiency as a function of the speed of a vehicle;

FIGS. 3 to 5 are views in axial section of a second, a and a fourth embodiment of the transmission device according to the invention;

FIG. 6 is an enlarged partial view in axial section of a centrifugal clutch of FIG. 5 in the disengaged state:

FIG. 7 is a view similar to that of FIG. 6 when the clutch is in the engaged state;

FIG. 8 is a partial view showing a flyweight tilted into the limit position;

FIG. 9 is a partial exploded perspective view of the clutch of FIGS. 6 to 8; and FIG. 10 is a diagrammatic view of an alternative version of the clutch.

DETAILED DESCRIPTION OF THE PREFERRED EMBODIMENTS

In the example illustrated in FIG. 1, the transmission device 1 according to the invention has an input shaft 2 connected to the output of a thermal engine 3 which can be the engine driving a motor vehicle, and an output 4 which is connected to the input of a driving axle 6.

The transmission device 1 comprises a selective coupling means with a relative angular slip which is produced in the form of a hydraulic torque converter 7. The converter 7 comprises a driving member which is a hydraulic energy generator or "pump" 8 connected to the input 2 by means of a centrifugal clutch 9. The latter is sensitive to the rotational speed of the input 2 in order to couple the input 2 to the pump 8 when the rotational speed of the input 2 exceeds, for example, 1,200 revolutions per minute (125 radians per second), that is to say slightly exceeds the idling speed of the engine 3.

The torque converter 7 furthermore comprises, in a conventional way, a driven member which is a hydraulic motor or "turbine" 11, and a "reactor" 12 which is suitably immobilised in terms of rotation relative to the frame, in order, during operation, to provide the oil with a reaction support allowing the conversion of the torque.

As is known, a torque converter is a device which, for a given torque applied to its pump 8, produces by means of its turbine 11 a torque oriented in the same direction and multiplied by a factor which is an increasing function of the relative angular slip of the turbine 11 in relation to the pump 8.

The transmission device 1 comprises, furthermore, a differential mechanism 13 produced in the form of a planetary gear train comprising a sun gear or planet wheel 14, a ring gear or crown 16 and planet gears or satellites 17 which mesh with the planet wheel 14 and with the crown 16.

The satellites 17 are mounted rotatably on a satellite carrier 18 forming a first of the three accesses of the differential mechanism 13, and this first access is connected directly in terms of rotation to the output 4 of the transmission device.

A second access 19 of the differential mechanism 13 is integral in terms of rotation with the crown 16, and it is likewise made integral in terms of rotation with the turbine 11 of the torque converter 7.

A third access 21 of the differential mechanism 13 is integral in terms of rotation with the planet wheel 14, and it is likewise made integral in terms of rotation with the pump 8 of the converter 7.

By "differential mechanism" is meant a triple-access mechanism, each access of which has an angular speed which is a function of the angular speed of the other two, this function being determined by the gear ratios connecting the three accesses in the mechanism to one another.

The transmission device 1 comprises, furthermore, a free wheel 22 which allows the second access 19, that is to say the crown 16, to rotate in the forward direction, that is to say in the direction tending to drive the output 4 of the transmission device in the direction corresponding to the operation of the vehicle in forward motion. In the example described, the input 2 and output 4 rotate in the same direction which constitutes the forward direction for all the elements of the device 1 which are capable of rotating about the central axis of the transmission. The free wheel 22 prevents the crown 16 from rotating backwards in relation to the frame of the transmission.

A clutch 23 is mounted for selectively coupling the first access 18 and the second access 19 of the differential mechanism 13, so as to ensure a direct drive between the input 2 and the output 4 of the device.

The clutch 23 is sensitive to the rotational speed of the output 4 of the device, so as to couple the first and second accesses 18 and 19 to one another above a particular rotational-speed threshold of the output 4, and it is also sensitive to the vacuum prevailing in the intake manifold (not shown) of the engine 3, in order to raise the abovementioned rotational-speed threshold when the vacuum prevailing in the manifold is low, this meaning that the torque required from the engine assembly consisting of the engine 3 and of the transmission device 1 is high. This influence of the vacuum has been represented diagrammatically by a piston/cylinder system 24.

A second free wheel 26 is interposed between the first access 18 and the third access 21, in order to prevent the first access 18 connected to the output 4 from rotating at a higher speed that the third access 21 connected to the input 2 of the device. Thus, when the output 4 tends to rotate faster than the input 2, for example on a descending gradient, it drives the engine 3 at a higher speed, thus allowing operation as an "engine brake".

The transmission device 1 operates as follows:

When the engine 3 is idling, the centrifugal clutch 9 is uncoupled, so that the transmission device 1 as a whole, with the exception of the input 2, is stationary if the wheels of the vehicle are stationary.

If the rotational speed of the input 2 is increased by action on the engine 3, the centrifugal clutch 9 makes the coupling between the input 2 and on the one hand the pump 8 of the converter 7 and on the other hand the third access 21, that is to say the planet wheel 14 of the planetary gear train 13. Because of the resistance of the output 4 to rotation, the rotation of the planet wheel 14 tends to cause the crown 16 to rotate in the opposite direction, this being opposed by the free wheel 22, so that the satellite carrier 18 and consequently the output 4 are driven in the same direction as the planet wheel 14, but at a speed stepped down in a ratio which can, for example, be 4, depending on the gear ratios chosen for the planetary gear train 13.

At the same time, the pump 8 of the converter 7 transmits a torque to the turbine 11 in the forward direction, and this torque is transmitted to the access 19 of the planetary gear train 13. At the outset, this torque is lower than the torque transmitted in the opposite direction to the crown 16 by the satellites 17, on the one hand because of some inertia of the oil contained in the converter 7 and on the other hand because of an insufficient rotational speed of the pump 8. Consequently, the crown 16 tends to rotate backwards and thus gains reaction support from the frame by means of the free wheel 22 which prevents this movement. The transmission then operates according to a first transmission ratio which is purely mechanical.

As soon as the converter 7 produces a sufficient torque on the turbine 11, the crown 16 is set in rotation in the forward direction and thereby transmits to the satellite carrier 18 a useful power which is added to that transmitted by means of the planet wheel 14. At this stage, the differential mechanism operates as a power adder.

With an increasing torque transmitted to the turbine 11 by the converter 7, the crown 16 assumes an increasing angular speed which approaches the angular speed of the planet wheel 14, to within the slip of the converter. The initial transmission ratio of the device 1 therefore changes progressively from a value which is, for example, 4 to 1 to a value which is in the neighbourhood of 1 to 1 and which constitutes the second ratio of the transmission.

Thus, the torque converter has brought about in the differential mechanism 13 a progressive coupling which caused the transmission to change from a first ratio to a second by continuous variation. This coupling was brought about as a function of the rotational speed of the pump 8, this speed determining the torque transmitted to the turbine 11 under stationary conditions, and by the reaction torque on the crown which is proportional to the resisting torque at the output 4 of the transmission. Consequently, if the resisting torque at the output 4 is high, the range of rotational speeds of the pump 8 during which the converter makes the transition between the first ratio and the second shifts upwards, this being desirable in many cases, especially for motor vehicles.

When the angular speed of the output 4 exceeds the threshold determined by the clutch 23 in the way explained above, the clutch 23 couples the satellite carrier 18 to the crown 16 in such a way that the transmission device 1 as a whole, with the exception of the reactor 12 of the converter 7, rotates at the speed of the input 2 which is therefore likewise that of the output 4.

In FIG. 2, unbroken lines represent an example of the curve of the efficiency R of the transmission of FIG. 1 as a function of the speed V of the vehicle Three operating phases can be distinguished there, namely a phase $P_1$ during which the crown 16 is stationary, a phase $P_2$ during which the crown 16 is in movement and some of the power is transmitted via the converter 7, and a phase $P_3$ corresponding to direct drive by means of the clutch 23. The efficiency is lower during the phase $P_2$, because it is affected by the efficiency of the converter which transmits some of the driving power. However, it is remarkable to find that, in all ranges, the efficiency is clearly higher than that of a conventional automatic transmission which is represented by broken lines in FIG. 2.

The example of FIG. 3 will be described only in terms of its differences from FIG. 2.

The turbine 11 of the converter 7 is no longer connected to the second access 19 of the planetary gear train 13 directly, but by means of a planetary reducer 27. More particularly, the turbine 11 is connected to the planet wheel 28 of the reducer 27, and the second access 19 of the differential mechanism 13 forms the satellite carrier of the planetary reducer 27 and to this effect carries satellites 29 which mesh on the one hand with the planet wheel 28 and on the other hand with a crown 31 of the planetary reducer 27. The crown 31 is associated with a free wheel 32 allowing it to rotate only in the forward direction. Also, a clutch 33 makes it possible to connect the second access 19 of the differential mechanism 13 selectively to the crown 31 of the planetary reducer 27.

When the clutch 33 is uncoupled, the planetary reducer 27 reduces the rotational speed of the second access 19 in relation to the rotational speed of the turbine 11, because the crown 31 tending to rotate backwards is prevented from this by the free wheel 32 and is therefore immobilised. The reduction ratio can be, for example, 2.5 to 1.

Conversely, when the clutch 33 is engaged, the planetary reducer 27 behaves as a direct drive, so that the crown 16 rotates at the same speed as the turbine 11, as in the preceding example.

A control box 34 acts on a member for adjusting the centrifugal clutches 23 and 33, for the purpose of modifying their respective speed thresholds as a function of parameters such as the position of the accelerator pedal of the engine 3, the vacuum in the intake manifold of the engine 3 and/or, where the clutch 33 is concerned, the rotational speed of the output 4. At all events, the speed threshold of the centrifugal clutch 33 is lower than that of the centrifugal clutch 23.

There are, furthermore, a means 36 for the selective blocking of the crown 16, a means 38 for the selective blocking of the crown 31, which are normally in the released state, and a means 37 for the selective blocking of the support of the free wheel 32, which is normally in the blocked state.

The transmission device of FIG. 3 operates as follows. It will be assumed hereafter that the blocking means 36 and 38 are in the released state and the blocking means 37 is in the blocked state, until the question of operation as an engine brake is dealt with.

During starting, once the centrifugal clutch 9 has changed to the engaged state and when the centrifugal clutches 23 and 33 a state, the first operating phase $P'_1$ (see FIG. 2) is substantially identical to the phase $P_1$ of the embodiment of FIG. 1. However, the torque converter 7 acts on the crown 16 by means of the reducer 27, so that it begins more quickly to supply the crown 16 with a torque exceeding the reaction torque strictly necessary for balancing the action of the planet wheel 14. The operating phase $P'_1$ is therefore shorter than the operating phase $P_1$.

Subsequently, as shown in FIG. 2 by the curve represented by small crosses and relating to the embodiment of FIG. 3, the efficiency curve moves away from that of the embodiment of FIG. 1.

The next phase $P'_2$ commences when the crown 16 begins to be driven in the forward direction by the converter 7 via the reducer 27. Because of the reducer, the crown 16 is driven only at a speed much lower than that of the planet wheel 14, for example 2.5 times lower (if the ratio of the reducer 27 is equal to 2.5) at the end of the phase $P'_2$ when the converter 7 now operates only with minimum slip. Returning to the preceding example in which the reduction ratio between the input 2 and the output 4 is equal to 4 when the crown 16 is blocked, this overall ratio becomes equal to 1.8 if the crown 16 is driven at a speed 2.5 times lower than that of the planet wheel 14. The phase $P'_2$ will therefore cause the transmission to change from a first ratio, the value of which is 4, to a second ratio, the value of which is slightly higher than 1.8 (in view of the slip of the converter 7 which is never cancelled completely). In this phase, the power transmitted by the converter is lower than during the phase $P_2$, as a result of the reducer 27, thereby substantially improving the efficiency and at the same time increasing the overall reduction ratio and consequently increasing the torque supplied to the driving axle 6.

A phase $P'_3$ then begins when the speed threshold of the centrifugal clutch 33 is reached, beyond which threshold the reducer 27 operates in direct drive, so that the transmission device will progressively start to operate according to a third transmission ratio in the neighbourhood of the value 1, as during the phase $P_2$ in the embodiment of FIG. 1. However, in the embodiment of FIG. 3, it was assumed that the phase $P'_3$ extended beyond the phase $P_2$ in view of division into four phases instead of 3. This can be obtained, for example, by using a converter 7 transmitting less torque at a given speed and with a given slip.

At the end of the phase $P'_3$, the speed threshold of the centrifugal clutch 23 is reached, and a direct-drive situation occurs in the transmission as a whole, the clutch 33 itself remaining in engagement.

During operation as an engine brake, the free wheel 26 between the input 2 and the output 4 always prevents the output 4 from rotating faster than the input 2.

A more effective engine brake can be obtained by putting the means 38 for blocking the crown 31 in the block position, so as to increase the rotational speed of the planet wheel 28 of the reducer 27 in relation to that of the crown 16, in order to cause the engine to operate at a ratio corresponding substantially to the situation $P'_2$.

An even more effective engine brake is obtained by releasing the means 38 and the means 37 and by blocking the means 36, in which case the transmission is blocked in the situation $P'_3$, the crown 31 rotating at high speed in the backward direction.

The embodiment of FIG. 4 will be described only in respect of its differences from that of FIG. 3. The centrifugal input clutch 9 is omitted, so that the input 2 of the transmission is connected directly to the pump 8 of the torque converter 7 and to the planet wheel 14 of the differential mechanism 13.

The support of the free wheel 22 is associated with a brake 39 controlled by a pneumatic actuator 41 under the action of the pressure prevailing in the intake manifold of the engine 3. The means 37 for blocking the free wheel 32 is replaced by a clutch 42 controlled by an actuator 43 operating by means of the pressure prevailing in the intake manifold under the control of the control box 34.

This embodiment operates according to the same phases $P'_1$, $P'_2$, $P'_3$ and $P'_4$ as that of FIG. 3. Only the method of changing from one phase to another differs somewhat.

When the engine 3 is idling, all the clutches and the blocking means are in the released state. The engine 3 drives the pump 8 and the planet wheel 14, thus producing a backward rotation of the crown 16, since the satellite carrier 18 is stationary, the vehicle being assumed to be stopped. This backward rotation of the crown 16 brings about a likewise backward rotation of the crown 31 of the reducer 27, since such a rotation encounters no resistance when the planet wheel 28 of the reducer 27 is driven by the converter 7 substantially at the same speed as the input 2.

When the driver presses on the accelerator pedal for the purpose of starting, an increase of pressure (a reduction of the vacuum) is transmitted to the actuator 41 which controls the progressive gripping of the clutch 39, thereby establishing a situation similar to that of FIG. 3, that is to say the crown 16 is prevented from rotating backwards.

The phase $P'_1$ could have been initiated by gripping the clutch 42 at the same time as the clutch 39. But by avoiding gripping the clutch 42 immediately, the (needless) action of the converter 7 during the phase $P'_1$ is cancelled. The usefulness of this is that it improves the efficiency even further, the more so because, in this embodiment where the converter 7 already rotates when starting is initiated, there is less delay in the activation of the oil of the converter. Another advantage is that the box 34 controlling the gripping of the clutch 42 thus controls the triggering of the phase $P'_2$ and can thereby delay or advance this triggering as a function of the operating parameters.

The phases $P'_2$, $P'_3$ and $P'_4$ succeed one another thereafter in the same way as in the embodiment of FIG. 3. For operation as an engine brake, the clutch 39 remains in the engaged state and the blocking means 36, 38 and the clutch 42 are controlled in the same way as were the blocking means 36, 38 and 37 of FIG. 3, respectively.

In the example of FIG. 5 which will be described only as regards its differences from that of FIG. 3, the first access 18 is connected to the output 4 of the transmission by means of an additional differential 51 which will be described later.

The second access 19 of the differential mechanism 13, integral in terms of rotation with the crown 16, is connected to the input 2 of the device by means of two successive centrifugal clutches 9 and 107. One of these clutches, that directly adjacent to the input 2, is the clutch 9 already described.

The other (clutch 7) of these two centrifugal clutches constitutes the selective coupling means for connecting the input 2 to the second access 19 of the differential mechanism 13 by means of a planetary reducer 27, with the possibility of a relative angular slip.

More particularly, the driving member 108 of the centrifugal clutch 107 at the same time constitutes the driven member of the clutch 9. The driven member 111 of the clutch 107 is connected to the planet wheel 28 of the reducer 27.

The third access 21 of the differential mechanism 13 is integral in terms of rotation with the planet wheel 14 and with the driving member 108 of the clutch 107.

The centrifugal clutch 107 is sensitive to the rotational speed of the input 2, as transmitted to its driving member 108 by means of the clutch 9, so as to change to the engaged state when the rotational speed of the input 2 crosses in the increasing direction a speed interval which, in terms of value, is located above the speed threshold to which the clutch 9 is sensitive. Moreover, this speed interval is variable as an increasing function of the torque tending to pass via the clutch 107. This interval can, for example, have a width of 500 revolutions per minute and its centre can move between 2,000 and 4,000 revolutions per minute as a function of the torque to be transmitted. An embodiment of such a clutch will be described later.

The clutch 23 is sensitive to the rotational speed of the first access 18 of the differential mechanism, in order to couple the first and second accesses 18 and 19 progressively to one another when the rotational speed of the first access 18 crosses a particular rotational-speed interval in the increasing direction. As in the clutch 107, means are provided for raising the values of this rotational-speed interval when the torque to be transmitted increases.

When the clutch 107 is gripped, but the clutch 23 is uncoupled and thus allows the second access 19 to rotate at a speed different from that of the driven member 111, the planetary reducer 27 reduces the rotational speed of the second access 19 in relation to the rotational speed of the driven member 111, because the crown 31 tending to rotate backwards is prevented from this by the free wheel 32 and is therefore immobilised. The reduction ratio can be, for example, 2.5 to 1.

On the contrary, when the clutch 23 is engaged, the entire assembly comprising the clutches 9 and 107, the planetary reducer 27 and the differential mechanism 13 operates in the direct-drive mode and rotates as a single unit.

In comparison with the device of FIG. 3, the clutch between the second access 19 and the crown gear 31 is omitted. In fact it has become superfluous, because when the clutch 107 is in the engaged state, the change of the clutch 23 to the engaged state, occurring at higher speeds of the first access 18, indirectly fixes the satellite carrier 19 and the planet wheel 28 relative to one another, so that the crown 31 is itself forced to rotate at the speed of the satellite carrier 19. This occurs because the converter of FIG. 3 has been replaced by the clutch 107 which, in the engaged state, does not produce any relative angular slip.

Likewise, the control device of the clutch 23 has been omitted.

The additional differential 51 is produced in the form of a planetary gear train comprising a crown 52 forming the input member and connected to the first access 18 of the differential mechanism 13. The crown 52 meshes with satellites 53 supported by a satellite carrier 54 which forms the output member. The satellites 53 also mesh with a planet wheel 56 of the differential 51.

The additional differential 51 is associated with a device 57 for selecting the direction of motion of the driving axle 6. The selection device 57 comprises a complex sliding gear 58 comprising an individual sliding gear 59 connected in terms of rotation to the satellite carrier 54, but movable axially in relation to the latter by means of splines 61, and an individual sliding gear 62 connected in terms of rotation to the planet wheel 56, but movable axially in relation to this by means of splines 63. The two individual sliding gears 59, 62 can rotate at different speeds, but are connected to one another for movements along the axis which are controlled by a manual mechanism (not shown) known per se. The sliding gear 59 has a claw 64 capable of interacting with a fixed claw 66 for immobilising the satellite carrier 54 and a claw 67 capable of interacting with a corresponding claw 68 of the output 4 for coupling the output 4 to the satellite carrier 54.

The individual sliding gear 62 has a claw 69 for interacting with a corresponding claw 71 of the output 4, so as to couple the planet wheel 56 to the output 4, and a claw 72 capable of interacting selectively with a corresponding claw 73 connected to a housing 74 of the transmission device 1 by means of a free wheel 76 preventing the claw 73 from rotating backwards.

The upper part of FIG. 5 shows the sliding gear 58 in the position of forward motion: the individual sliding gear 59 connects the satellite carrier 54 to the output 4 and releases the satellite carrier 54 from the fixed claw 66, whilst the individual sliding gear 62 releases the output 4 from the planet wheel 56 and connects the planet wheel 56 to the housing 74 by means of the free wheel 76.

To change to reverse motion, the complex sliding gear 58 is moved to the left in FIG. 5, as shown at the bottom of this Figure, thereby simultaneously executing the following operations: the uncoupling of the satellite carrier 54 from the output 4 and the immobilisation of the satellite carrier 54 in terms of rotation by means of the claw 66, the coupling of the output 4 to the planet wheel 56 and the release of the planet wheel 56 with respect to the housing 74.

In this latter situation, therefore, the satellite carrier 54 is prevented from rotating, so that the satellites 53 behave as movement reversers causing the planet wheel 56 to rotate in the backward direction when the crown 52 rotates in the forward direction There is, moreover, a centrifugal clutch 77 which progressively connects the satellite carrier 54 and the crown 52 to one another when the rotational speed of the satellite carrier 54 crosses a particular rotational speed interval, so as to cause the additional differential to operate by direct drive when the rotational speed of the satellite carrier 54 is located above the interval. As with the clutches 107 and 23, this speed interval moves towards higher values when the torque to be transmitted itself becomes higher.

Thus, operation in forward motion is as follows: when the clutch 77 is in the disengaged state, the planet wheel 56 constitutes a stationary reaction member and the satellite carrier 54 rotates in the forward direction at a speed below that of the crown 52. The output 4 rotates at the same speed as the satellite carrier 54. When the clutch 77 is in the engaged state, the differential 51 as a whole is in the direct-drive state, and the planet wheel 56 rotates at the same speed as the satellite carrier 54 and the crown 52, as allowed by the free wheel 76 which prevents rotation only in the backward direction. The output 4 then rotates at the same speed as the first access 18 of the differential mechanism 13.

Also provided between the crown 52 and the satellite carrier 54 is a free wheel 78 which performs the function of allowing operation as an engine brake by preventing the satellite carrier 54 from rotating faster than the crown 52.

There will now be described with reference to FIGS. 6 to 9 a centrifugal clutch which reconciles the technical effects and the advantages of great simplicity of production, very progressive operation, low weight, small bulk and sensitivity to the torque to be transmitted, in order to increase the speed value at and above which the engaged state is reached when the torque to be transmitted increases.

This clutch is described by taking the example of the clutch 23, but it will be clear that this description can apply either to the clutch 107 or to the clutch 77 or even equally to the clutch 9 which could likewise be produced in this way.

The clutch 23 is a clutch of the multi-disc type, that is to say it comprises an alternation of discs 79 integral in terms of rotation with the crown 16 and of discs 81 integral in terms of rotation with the satellite carrier 18. The discs 79 comprise an external peripheral toothing which meshes axially slidably with internal splines 82 of a collar 83 fixed to the crown 16. The discs 81 comprise an internal toothing which meshes axially slidably with external splines 84 formed on a collar 86 fixed to the satellite carrier 18 and terminating in a stationary stop 87 for the discs 79 and 81. The external splines 84 are surrounded by the internal splines 82 of the collar 83.

According to an important feature of the clutch 23, a loose friction ring 88 is interposed in each gap between two successive discs 79 and 81. The loose friction rings 88 are produced, for example, from bronze if the discs 79, 81 are made of steel. The rings 88 do not mesh either with the splines 82 or with the splines 84, but are centred by means of their bore on the tops of the splines 84. The loose rings 88 have a thickness of, for example, 0.5 mm, the discs, 79, 81 having, for example, a thickness of 0.8 mm. A considerable number of discs and rings can therefore be stacked thus within a very limited axial space.

During operation, the rings assume a speed which is the average of the speeds of the discs 79 and 81, thereby dividing in two all the frictional speeds in the clutch and multiplying by two the surfaces exposed to heating.

On the side opposite the stop 87, the splines 84 are limited axially by a removable ring 89 having a semicircularly rounded radially outer edge 91. The clutch possesses, furthermore, a series of flyweights 92, each consisting of a metal plate arranged in an axial plane of the transmission device. Each flyweight 92 has in its periphery, on its radially inner edge, a notch 93 in which the edge 91 is received. The notch 93 of each flyweight 92 has a bottom in the form of a segment of a circle, at the same radius R as the profile of the edge 91, and two lateral edges 94 diverging relative to one another from the bottom of the notch at an angle approximately equal to 15°. The flyweights 92 are thus mounted in a rocking manner on the peripheral edge 91. The centre of gravity G of the flyweights 92 is located towards the ring 89 opposite the discs 79 and 81. At rest, the flyweights 92 have the position shown in FIG. 6, with the centre of gravity G relatively near to the axis of rotation (not shown in FIG. 6) of the satellite carrier. When the satellite carrier is in rotation, the centrifugal force exerted on the flyweights at the centre G causes the flyweights to rock about the centre C of the semicircular profile of the edge 91, as shown in FIG. 7.

FIG. 9 shows three of the flyweights 92, but it must be understood that the flyweights are uniformly distributed over the entire periphery of the transmission device. There can, for example, be forty flyweights weighing a few grams, for example 7 grams each.

Each flyweight 92 possesses, in the direction of the discs 79 and 81, an actuating face 96 which has a movement component directed axially towards the discs 79 and 81 when the centre of gravity G pivots radially outwards under the action of the centrifugal force. The actuating face 96 of each flyweight is pressed against a curved face 97 belonging to a thrust ring 98 which is common to all the flyweights and which is interposed between the flyweights 92 and the discs 79, 81 and has on its radially inner edge a toothing 99 meshing axially slidably with the external splines 84 and the collar 86.

Thus, as shown in FIG. 7, when the flyweights move radially outwards under the action of the centrifugal force, their actuating face 96 pushes the thrust ring 98 towards the discs and it moves along the splines 84 in the direction of compression of the discs 79, 81 and of the loose rings 88 interposed between them. In FIG. 6, the spacing between the discs when the clutch is in the released state has been exaggerated. In actual fact, this spacing would be invisible to the naked eye, and therefore the movement of the ring 98 necessary for causing the clutch to change from its disengaged state can be very slight, for example of the order of 1 mm. In FIG. 9, part of the ring 98 is imagined as being removed in order to show the rocking mounting of one of the flyweights 92 on the edge 91. In actual fact, the ring 98 extends over the entire periphery of the collar 86.

The ring 98 is attached by means of its outer periphery to a cage 201 which extends axially in the opposite direction to the discs 79 and 81 as far as an axial end 202, through which axially directed slots 203 open, in each of which one of the flyweights 92 is guided so as to keep it in its respective axial plane during its rocking movement about the edge 91.

As shown in FIG. 6, the cage 201 passes radially beyond the edge 91 between the latter and the semicircularly rounded radially inner edge 204 of a surround ring 206. Each flyweight 92 possesses, in the radially outer part of its periphery, a notch 207 having a bottom in the form of a segment of a circle and two edges diverging at an angle of approximately 15°. The notches 207 receive the edge 204 of the ring 206 in a rocking manner. The location of the notch 207 on each flyweight 92 is selected so that the notch 207 executes an almost purely axial movement when the flyweight rocks about the centre C of the edge 91. For this purpose, the notches 207 are arranged in such a way that the edge 204 of the ring 206 moves on either side of the plane of the ring 89. The purpose of the surround ring 206 is to prevent the flyweights from escaping freely outwards in a radial direction and also to couple the flyweights together in their rocking movement about the edge 91.

In its radially outer region, the surround ring 206 possesses, furthermore, a stop wing 208 of general cylindrical shape, against which the flyweights 92 butt in a position of maximum radial deflection shown in FIG. 8. This position is reached when the state of wear of the discs 79, 81 and of the rings 88 is at a maximum. In this case, the bearing of the flyweights 92 against the stop wing 208 of the ring 206 prevents the flyweights 92 from being deflected excessively and, for example, from rubbing against a housing in which the transmission device is enclosed.

In FIGS. 6 and 7, each flyweight 92 defines with its contour an appendage 209 which is directed towards the axis of the mechanism and on which can bear selectively a lining 211, itself bearing by means of a thrust ball bearing 212 on an annular pusher 213, in order to keep the clutch in the disengaged state if it is desired that the transmission should operate with a stepdown ratio higher than that tending to occur automatically in the transmission device under given conditions.

FIG. 6 shows the lining 211 in the position preventing the change to the engaged state, whilst the position allowing the change to the engaged state has been shown in FIG. 7.

As is customary for multi-disc clutches of conventional automatic transmissions, the multi-disc clutch according to the present invention operates with a lubrication of the discs 79, 81 and of the loose rings 88.

The means 211, 212, 213 illustrated in FIGS. 6 and 7 are not shown in FIG. 5, and they afford an additional possibility for the operation of the gear box, but are not indispensable.

The operation of the multi-disc clutch according to the present invention will now be explained.

The lever arm L which the centrifugal force F exerted at the centre G has about the centre of rotation C is markedly greater than the lever arm m which the bearing force H of the face 96 on the edge 97 of the ring 98 has about the same centre C. The torque of the force F about the centre C is balanced by the reaction torque of the ring 98 on the flyweights 92, thus resulting in the relation:

$F \times L = H \times m$, hence $H = F \times L / m.$

Thus, in the example illustrated, where L is approximately four times greater than the force H receives by the ring 98 is equal to approximately four times the centrifugal force generated by the flyweights 92.

Force H generates on each disc 79 or 81 a frictional force tending to cause the discs 79 and 81 to rotate at the same speed. Since each disc receives the entire compressive force H of all the flyweights 92, an increase in the number of discs 79 and 81 and consequently of the loose rings 88 corresponds to a reduction of the speed beyond which the clutch is in the engaged state. Thus, in other words, the multiplicity of discs 79 and 81 is another factor in the amplification of the centrifugal force generated by the flyweights 92. Because of this double amplification of the centrifugal force and also because of the possibility of having a large number of flyweights distributed over the periphery of the clutch, flyweights of a surprisingly low unit mass (for example 7 grams) are sufficient to cause a clutch transmitting considerable power to change to the engaged state. As already explained above, the loose rings 88 multiply by two the friction surfaces between the successive discs, thus dividing the frictional speeds by two, because each ring assumes a speed which is the average of those of the two discs between which it is located. It has been verified, in fact, that, contrary to what might be thought, the rings 88 do not tend to adhere to one of the discs and to transfer the entire friction to the interface with the other disc.

Moreover, because of the great many friction surfaces, there is an appreciable stroke of the bearing ring 98 between the moment when the engagement process begins from the disengaged state and that when the completely engaged state is reached. This appreciable stroke, for example 1 mm, makes the clutch very progressive and the engagement process is spread over a particular speed range, instead of occurring at a specific speed.

Furthermore, since the pressure force exerted by the thrust ring 98 is an increasing function of the rotational speed of the flyweights 92 about the axis of the mechanism, and since in addition the compressive force to be exerted on the clutch to ensure complete engagement is a function of the torque to be transmitted, the speed interval during which engagement takes place moves towards high values when the torque to be transmitted is higher.

Consequently, the clutch according to the present invention gives two interesting results for motor-vehicle transmissions:
    the transmission ratio varies progressively during the engagement process; and
    the change towards a ratio of less stepping down occurs at speeds which are higher, the higher the torque to be transmitted.

From the engaged state, a disengagement process begins if the rotational speed of the flyweights 92 crosses in the direction of lower values a speed interval which once again depends on the torque to be transmitted. For a given torque, this speed interval is lower than the speed interval of the engagement process. This phenomenon, which occurs as a result of particular adhesion effects of the discs between one another when they are in engagement, likewise corresponds to what is desired for the transmission in motor vehicles.

The advantage of the clutch according to the present invention is, furthermore, that it is very easy to mount. With the ring 89 not yet being associated with the satellite carrier, the discs 79 and 81 and the rings 88 are installed by axial sliding between the two collars 83 and 86. This stacking is completed by placing the thrust ring 98 on the splines 84. Moreover, the flyweights 92 are mounted between the ring 89 and the surround ring 206. For this purpose, each flyweight 92 is engaged flat between the ring 206 and the ring 89 and is then pivoted through 90°. In other words, a mounting of the quarter-turn type is carried out for each flyweight 92. When all the flyweights 92 have been mounted thus, this assembly is brought axially towards the satellite carrier, each flyweight being engaged into the corresponding slot 203 of the cage 201. It is thereafter sufficient to fix the ring 89 to the front face of the collar 86, for example by means of screws.

To produce a clutch having specific characteristics, the number of discs 79 and 81 and the number of flyweights 92 are chosen accordingly. To obtain a clutch having greater progression, without modifying the speed at which engagement takes place, given a particular torque to be transmitted, the number of discs can be increased and the number of flyweights reduced in the same proportion.

The transmission device of FIG. 5 as a whole operates as follows. It will be assumed hereafter that all the centrifugal clutches have the structure described with reference to FIGS. 6 to 9 in respect of the clutch 23. It will be assumed, too, that the blocking means 36, 38 and 211 are in the released state and the blocking means 37 is in the blocked state, until the question of operation as an engine brake is dealt with.

When the engine 3 is idling, the centrifugal clutch 9 is uncoupled, so that the transmission device 1 as a whole, with the exception of the input 2, is stationary if the wheels of the vehicle are stationary.

If the rotational speed of the input 2 is increased by acting on the engine 3, the centrifugal clutch 9 makes the coupling between the input 2 and on the one hand the driving member 108 of the clutch 107 and on the other hand the third access 21, that is to say the planet wheel 14 of the planetary gear train 13. At this stage, the clutch 107 is in the disengaged state. Operation then corresponds to that of phase $P'_1$ of FIG. 2. This is a first ratio of the transmission.

With the rotational speed of the input 2 continuing to increase, the engagement process begins in the centrifugal clutch 107, and the latter transmits a torque to the access 19 of the planetary gear train 13. This torque is transmitted to the crown 16 by the reducer 27 which multiplies it in the ratio of, for example, 2.5. The crown 31 of the reducer 27 tends to rotate in the backward direction, this being prevented by the free wheel 32. At the outset, the torque so multiplied is lower than the torque transmitted in the opposite direction to the crown 16 by the satellites 17, in view of the still low rotational speed of the driving member 108 and therefore of the flyweights which it drives. The crown 16 consequently still tends to rotate in the backward direction and continues to gain reaction support on the frame by means of the free wheel 22 which prevents this movement.

As soon as the clutch 107 produces a sufficient drive torque on the driven member 111, the crown 16 is set in rotation in the forward direction and thereby transmits to the satellite carrier 18 a useful power which is added to that transmitted by means of the planet wheel 14. At this stage, the differential mechanism 13 operates as a power adder.

With the torque transmitted by the clutch 107 to the driven member 111 increasing, the crown 16 assumes an increasing angular speed which reaches the angular speed of the planet wheel 14, as divided by the reduction ratio in the reducer 27, when the clutch 107 reaches the completely engaged state. The initial transmission ratio of the device 1 therefore changes progressively from a value which is, for example, 4 to 1 to a value which is 1.8 to 1 (ratio between the rotational speed of the planet wheel 14 and the satellite carrier 18 when the crown 16 rotates 2.5 times less quickly than the wheel 14). This is a second ratio of the transmission device. As explained above, the rotational-speed interval of the input 2 in which the progressive change from the first ratio to the second takes place is a function of the torque to be transmitted. In fact, an increased speed generating an increased gripping force in the clutch will be necessary in order to transmit an increased torque. It will be seen that the losses attributable to friction in the clutch 107 are surprisingly low, the wear likewise proving to be very low, as a result of the clutch structure according to the invention and also because only a minor part of the power passes via the clutch 107 when the latter slips.

When the angular speed of the satellite carrier 18 crosses in an increasing direction the speed interval defined by the clutch 23 as a function of the torque to be transmitted, the clutch 23 couples the satellite carrier 18 to the crown 16, so that the transmission device 1 as a whole between the input 2 and the satellite carrier 18 rotates at the speed of the input 2. This corresponds to a third ratio of the transmission device.

Like the clutch 107, the clutch 23 transmits only some of the power during the slip.

During all the above operating phases, the centrifugal clutch 77 was in the uncoupled state.

Subsequently, the speed of the satellite carrier 54 crosses in an increasing direction the speed interval in which the clutch 77 changes progressively to the engaged state, thus ensuring a direct drive in the transmission device as a whole, this corresponding to a fourth ratio of the transmission device.

During operation as an engine brake, the free wheels 26 and 78 between the input 2 and the output 4 always prevent the output 4 from rotating faster than the input 2.

A more effective engine brake can be obtained by putting a means 221 for blocking the crown 52 in the blocking position, in order to force the gear train 51 to function as a reducer, if need be with the use of a means, such as 211, 212, 213 (FIGS. 6 and 7), for the forced change of the clutch 77 to the disengaged state.

An even more effective engine brake can be obtained by putting the means 38 and 211, for blocking the crowns 31 and 52 respectively, simultaneously in the blocking position, so as furthermore to increase the rotational speed of the planet wheel 28 of the reducer 27 in relation to that of the crown 16, in order to cause the transmission device to operate according to the second ratio of the transmission.

An even more effective engine brake is obtained by releasing the means 38 and the means 37 and by blocking the means 36, in which case the transmission is blocked in the first transmission ratio, the crown 31 rotating at high speed in the backward direction.

FIG. 10 shows another example of a clutch according to the invention which differs from that of FIGS. 6 to 9 in that the cage 201 and the peripheral edge 91 are integral with the internal splines 82. The cage 201 is therefore no longer axially movable and serves for connecting the splines 82 to the edge 91 by means of a peripheral bell 222 which surrounds the flyweights 92 and the surround ring 206. The edge 201 is located almost opposite the thrust ring 98, but with an outward radial offset of the edge 91, so that the movement of the actuating surface 96 of the flyweight has an axial component in the direction of compression of the clutch discs 79, 81 when the centre of gravity G of the flyweight moves radially outwards.

The four embodiments just described can operate without control hydraulics and are extremely light, compact and economical. In particular, the components of the type of the free wheel, centrifugal clutch and the blocking means are trade components of very low cost price. All the clutches between two movable members are simple because they are actuated by centrifugal force. To put a figure on this, it can be said that a transmission according to the invention costs five to ten times less to produce than a current automatic transmission, and its bulk is approximately two to three times smaller. Moreover, the fuel consumption and the performance at reduced speed are improved very appreciably.

Of course, the invention is not limited to the examples described and illustrated.

It will be possible to simplify the device of FIG. 1 further by omitting the centrifugal clutch 9 and the free wheel 22, the input 2 then being connected directly to the pump 8. During idling, the planet wheel 14 is driven in the forward direction and the crown 16 in the backward direction because of the immobility of the satellite carrier 18, the vehicle being assumed to be stopped. This backward rotation is transmitted to the turbine 11 which is therefore forced to rotate in the opposite direction to the pump 8, thus resulting in a heating of the oil and a loss of power.

Starting from the embodiment of FIG. 5, it would be possible to produce a device with only two ratios having a progressive transition between one another, by omitting the reducer 27, the additional differential 51 and one of the clutches 107 and 23 and by connecting the satellite carrier 18 directly to the output 4.

A device with three ratios could also produced by omitting the additional differential 51 and by connecting the satellite carrier 18 to the output 4.

The differential 51 could be interposed between the driven member of the clutch 9 on the one hand and the driving member 108 (itself remaining connected to the access 21) on the other hand.

There could be a plurality of loose rings, such as 88, in each gap between two successive discs, such as 79 and 81.

I claim:

1. A variable-ratio transmission device for a motor vehicle, the transmission device comprising an input and an output; a differential mechanism having a first access, a second access, and a third access, the differential mechanism defining a first transmission ratio and a second transmission ratio, the rotational speed of the output relative to that of the input being higher during operation according to the second ratio than during operation according to the first ratio; at least a first selective coupling means for effecting the change from the first ratio to the second, the first selective coupling means having a driving member and a driven member and being of a type which allows relative angular slip between the driven member and the driving member as a function of torque transmitted between the members and rotational speed of the driving member;

means for connecting the input of the device to the driving member of the first selective coupling means independently of any of the accesses of the first differential mechanism;

means for connecting the output of the device to the first access of the first differential mechanism;

means for connecting the driven member of the first selective coupling means to the second access of the first differential mechanism;

means for connecting the input of the device to the third access of the first differential mechanism independently of the first selective coupling means; and means for preventing the second access from rotating backwards during operation according to the first transmission ratio.

2. A transmission device according to claim 1 wherein the means for preventing rotation in the backward direction comprises a free wheel.

3. A transmission device according to claim 1, wherein the means for preventing rotation comprises means for deactivating the means for preventing rotation in the backward direction for operation with the output stationary and the motor of the vehicle idling.

4. A transmission device according to claim 1, wherein the at least a first selective coupling means further includes a second selective coupling means comprising direct-drive means for selectively fixing two of the first, second, and third accesses of the first differential mechanism relative to one another so as to provide a direct drive.

5. A transmission device according to claim 4, wherein the direct-drive means (23, 24) are responsive to the rotational speed of the output of the transmission device and to a function of the load transmitted by the transmission device for selectively fixing said two of the first, second, and third accesses of the first differential mechanism relative to one another.

6. A transmission device according to claim 5, wherein the direct-drive means comprises a clutch which progressively connects two of the first, second, and third accesses of the first differential mechanism when the rotational speed of the output crosses in an increasing direction a speed interval for the change to direct drive.

7. A transmission device according to claim 1, wherein the means for connecting the driven member of the first selective coupling means to the second access of the first differential mechanism comprises a speed reducing gear train having two ratios.

8. A transmission device according to claim 7, wherein one of the two ratios of the speed reducing gear train is a direct-drive ratio.

9. A transmission device according to claim 8, wherein the speed reducing gear train comprises a second differential mechanism including a reaction member; a free wheel mounted between the reaction member and a stationary member for preventing the reaction member from rotating in the direction of a reaction transmitted to it during the speed reduction between the driven member (11, 111) of the first selective coupling means and the second access of the first differential mechanism; and a clutch for selecting the direct drive ratio of the second differential mechanism to provide a direct drive between the driven member of the first selective coupling means and the second access of the first differential mechanism.

10. A transmission device according to claim 9, further comprising means for releasing the free wheel associated with the reaction member during operation according to the first transmission ratio.

11. A transmission device according to claim 1, wherein the means for connecting the input of the device to the driving member of the first selective coupling means comprises an input clutch.

12. A transmission device according to claim 11, wherein the input clutch is a clutch sensitive to the rotational speed of the input of the device, in order to connect the input of the device to the driving member of the first selective coupling means when the rotational speed of the input of the device exceeds a particular threshold.

13. A transmission device according to claim 12, wherein the first selective coupling means connects the input of the device progressively to the second access of the first differential mechanism when the rotational speed of the input of the device crosses a predetermined speed interval in the increasing direction, the predetermined speed interval being located higher in terms of value than said particular threshold.

14. A transmission device according to claim 1, wherein the at least a first selective coupling means comprises an additional differential that is interposed mechanically in series with the assembly comprising the first differential mechanism and the first selective coupling means, the additional differential having a reaction member normally prevented from rotating in the backward direction and automatic means sensitive to the rotational speed in order to put the input and the output of the additional differential on direct drive.

15. A transmission device according to claim 14, further comprising means of reverse motion for selectively and substantially simultaneously uncoupling and immobilizing the output of the additional differential, releasing the reaction member to allow it to rotate in the backward direction and coupling the reaction member at least indirectly to the output of the device.

16. A transmission device according to claim 1, wherein the first selective coupling means is a clutch controlled as a function of the rotational speed of the driving member of the first selective coupling means so as to change progressively from a disengaged state to an engaged state when the rotational speed of the driving member of the first selective coupling means crosses a predetermined speed interval in the increasing direction.

17. A transmission device according to claim 16, wherein the clutch controlled as a function of the speed comprises means for varying the speed interval as an increasing function of the torque transmitted by the device.

18. A transmission device according to claim 17, wherein the means for varying the speed interval comprises means for applying to the clutch controlled as a function of the speed a gripping force which is a substantially continuous function of the speed, at least over a predetermined range of variation.

19. A transmission device according to claim 16, wherein the clutch controlled as a function of the rotational speed is a clutch of the multi-disc type comprising first discs rotatably connected to the driving member and second discs rotatably connected to the driven member of the clutch, the second discs being placed between successive ones of the first discs.

20. A transmission device according to claim 19, wherein the at least one clutch controlled as a function of rotational speed comprises loose friction rings not rotatably connected to either the driving member or the driven member, each friction ring being interposed between the successive first and second discs.

21. A transmission device according to claim 20, wherein the first and second discs are made of steel and the loose friction rings are made of bronze.

22. A transmission device according to claim 20, wherein the thickness of the loose friction rings is of the order of 0.5 mm.

23. A transmission device according to claim 19, wherein the clutch controlled as a function of the rotational speed comprises an assembly of flyweights mounted as rockers on a peripheral edge driven in rotation at the speed to which the clutch is sensitive, each flyweight being guided in a substantially axial slot of a cylindrical cage common to all the flyweights and being integral with an actuating surface pressed at least indirectly onto the discs of the clutch, the actuating surfaces of the flyweights having a component of axial movement in the direction of axial compression of the clutch when the flyweights pivot as rockers under the action of centrifugal force.

24. A transmission device according to claim 23, wherein the slots of the cylindrical cage are open at one axial end of the cylindrical cage.

25. A transmission device according to claim 23, wherein the cylindrical cage is fixed to a thrust ring of the discs of the clutch, on which ring the actuating faces of the flyweights bear.

26. A transmission device according to claim 23, wherein the clutch of the multi-disc type comprises a surround ring which surrounds the assembly of flyweights and which is coupled in terms of axial movement to the flyweights in order to synchronize the movements of the flyweights.

27. A transmission device according to claim 26, wherein the surround ring comprises a stop limiting the rocking of the flyweights under the action of centrifugal force.

28. A transmission device according to claim 23, wherein each flyweight comprises a solid plate having on its periphery a notch for receiving the peripheral edge.

29. A transmission device according to claim 1, in which the first selective coupling means is a hydraulic torque converter of which the driving member is a converter pump and the driven member is a converter turbine.

* * * * *